US010332398B2

(12) United States Patent
Khojastepour et al.

(10) Patent No.: US 10,332,398 B2
(45) Date of Patent: Jun. 25, 2019

(54) SMART PARKING FACILITY MANAGEMENT BY USING WIRELESS COMMUNICATION TECHNIQUES TO PERFORM STATIONARY AND MOVING VEHICLE DETECTION

(71) Applicant: NEC Laboratories America, Inc., Princeton, NJ (US)

(72) Inventors: Mohammad Khojastepour, Lawrenceville, NJ (US); Mustafa Arslan, Princeton, NJ (US); Sampath Rangarajan, Bridgewater, NJ (US)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 15/874,333

(22) Filed: Jan. 18, 2018

(65) Prior Publication Data
US 2018/0211519 A1    Jul. 26, 2018

Related U.S. Application Data

(60) Provisional application No. 62/448,442, filed on Jan. 20, 2017.

(51) Int. Cl.
*B60Q 1/48* (2006.01)
*G08G 1/127* (2006.01)
*G08G 1/01* (2006.01)
*G06K 7/10* (2006.01)
*H04B 17/318* (2015.01)
(Continued)

(52) U.S. Cl.
CPC .............. *G08G 1/127* (2013.01); *G01S 13/75* (2013.01); *G06K 7/10009* (2013.01); *G06K 7/10366* (2013.01); *G06K 7/10415* (2013.01); *G08G 1/01* (2013.01); *G08G 1/142* (2013.01); *G08G 1/144* (2013.01); *G08G 1/148* (2013.01); *H04B 17/318* (2015.01); *H04B 17/345* (2015.01)

(58) Field of Classification Search
None
See application file for complete search history.

(56) References Cited

U.S. PATENT DOCUMENTS

2006/0180647 A1*  8/2006  Hansen ............... B60S 3/00
                                          235/375
2012/0092189 A1*  4/2012  Jordan ............... G08G 1/14
                                          340/932.2
(Continued)

OTHER PUBLICATIONS

Jinno "Distance-Adaptive Spectrum Resource Allocation in Spectrum-Sliced Elastic Optical Path Network", IEEE Communications Magazine, Aug. 2010, pp. 138-145.

*Primary Examiner* — Adolf Dsouza
(74) *Attorney, Agent, or Firm* — Joseph Kolodka

(57) ABSTRACT

Systems and methods for detecting occupancy of at least one parking space by a vehicle are described. Detecting occupancy of at least one parking space includes at least one tag device fixed to a respective one of the at least one parking space. A first reader device is configured to interrogated the at least one tag device and detect a reply signal from the at least one tag device. A processor is configured to analyze the reply signal from the tag device including analyzing a received signal strength indication and a differential phase change of the reply signal to determine the presence of a vehicle in the parking space due to interference of the received signal by a signal blocking body.

20 Claims, 9 Drawing Sheets

(51) Int. Cl.
*G08G 1/14* (2006.01)
*G01S 13/75* (2006.01)
*H04B 17/345* (2015.01)

(56) References Cited

U.S. PATENT DOCUMENTS

| | | | | |
|---|---|---|---|---|
| 2014/0210646 A1* | 7/2014 | Subramanya | ............ | B61L 29/28 340/928 |
| 2014/0343891 A1* | 11/2014 | Becker | .................. | G07F 17/246 702/150 |
| 2015/0058101 A1* | 2/2015 | Han | ....................... | G07B 15/02 705/13 |

* cited by examiner

SMART PARKING FACILITY MANAGEMENT BY USING WIRELESS COMMUNICATION TECHNIQUES TO PERFORM STATIONARY AND MOVING VEHICLE DETECTION

RELATED APPLICATION INFORMATION

This application claims priority to 62/448,442, filed on Jan. 20, 2017, incorporated herein by reference herein its entirety.

BACKGROUND

Technical Field

The present invention relates to vehicle detection and tracking, and more particularly to detecting and tracking vehicles in a parking facility for smart management of parking facility resources.

Description of the Related Art

Parking a vehicle can often be a slow and laborious process. Upon entering a parking facility, a driver usually has no knowledge of the number of open parking spots, or indeed if any open parking spots exist at all. In some cases, a parking facility may have a rudimentary indication of whether spots are available or not. However, even in these scenarios, a driver does not know how many available spots there are, or where they are located.

As a result, a driver must drive through a lot searching for an open space, often in a crowded lot with a lot of other drivers similarly trying to find parking spaces. This makes finding a spot difficult because the driver does not know where to go. Moreover, the driver similarly will not know how to get to particular locations, such as a given parking space, a stairwell, and entry/exit way, etc. And once a driver does find a parking spot, the driver will have no record of where they parked their vehicle. As a result, finding the vehicle when the driver returns can often be more difficult than finding the parking space in the first place.

SUMMARY

According to an aspect of the present principles, a system is provided for detecting occupancy of at least one parking space by a vehicle. The system includes at least one tag device fixed to a respective one of the at least one parking space. A first reader device is configured to interrogated the at least one tag device and detect a reply signal from the at least one tag device. A processor is configured to analyze the reply signal from the tag device including analyzing a received signal strength indication and a differential phase change of the reply signal to determine the presence of a vehicle in the parking space due to interference of the received signal by a signal blocking body.

According to another aspect of the present principles, a method is provided for detecting occupancy of at least one parking space by a vehicle. The method includes interrogating at least one tag device by a reader device, each of the at least one tag device being fixed to a respective one of the at least one parking space. The method further includes detecting, with the reader device, a reply signal from the at least one tag device. Further included is analyzing the reply signal from the tag device including analyzing a received signal strength indication and a differential phase change of the reply signal to determine the presence of a vehicle in the parking space due to interference of the received signal by a signal blocking body.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
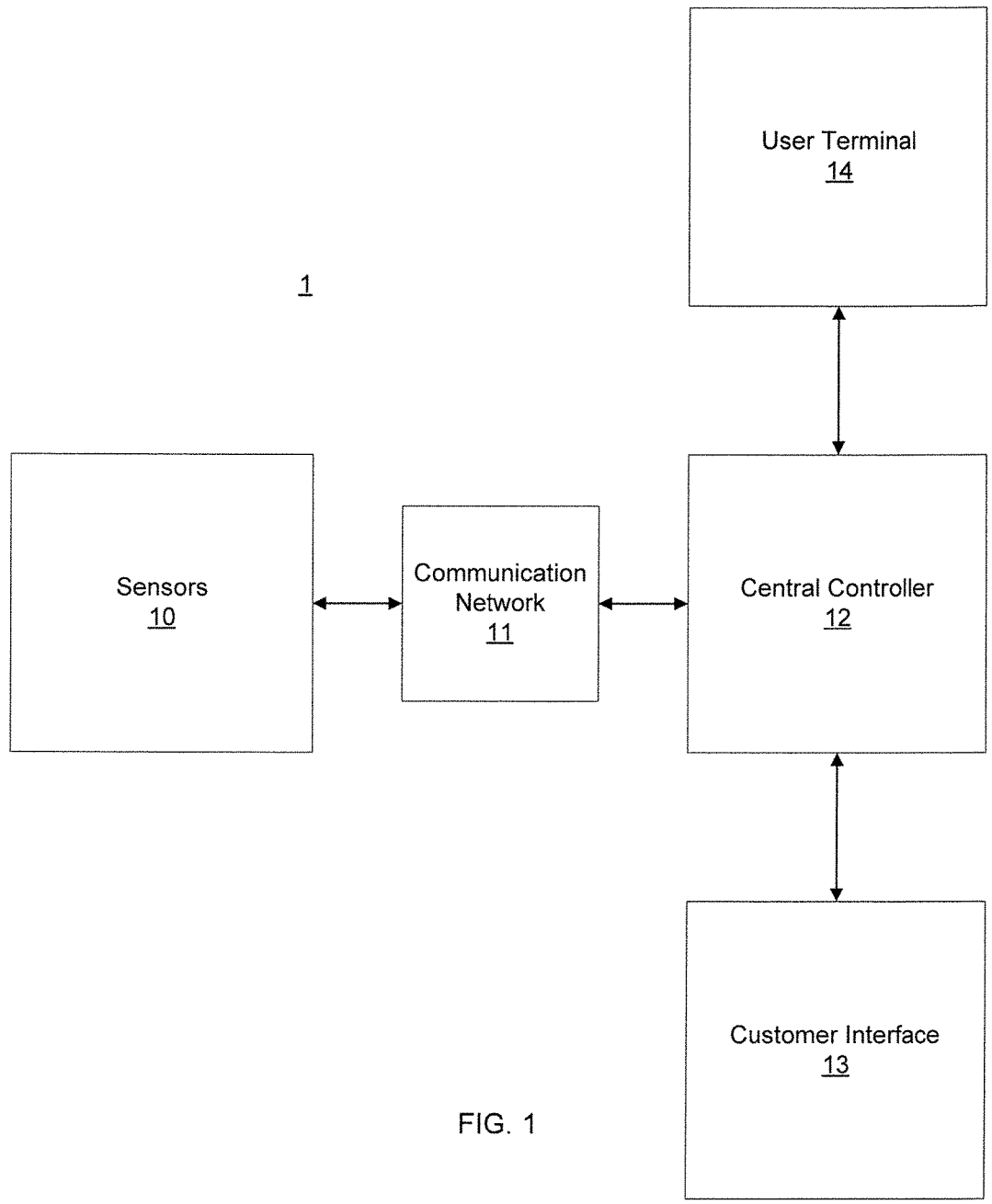
FIG. 1 is a block/flow diagram illustrating a high-level system/method for smart parking facility management by using wireless communication techniques to perform stationary and moving vehicle detection, in accordance with the present principles.

In accordance with the present principles, systems and methods are provided for detecting vehicles and parking spaces in parking facilities for parking facility management.

Modern vehicles often contain large amounts of metal and other electromagnetic (EM) wave disrupting materials, including metals. As a result, when a vehicle is close to a sensor that can detect those EM waves, such as, e.g., radio frequency waves and magnetic fields, characteristics of the EM waves will be disrupted and changed. For example, the iron of a vehicle will vary a magnetic field around the vehicle, and a magnetometer may detect those variations. Alternatively, an RF detector, such as radio frequency identification (RFID) reader or near field communication (NFC) reader may detect variations in an RF signal.

As a result, a detection system may be employed that exploits the EM variations resulting from the presence of vehicles. The detection system may even be configured to sense real-time variation of the EM waves, thus detecting movement of vehicles. By employing such a system in a parking facility such as a parking facility, the presence of vehicles in parking spots may be determined, and even traffic generally through the parking facility can be determined.

Additionally, the sensors may be configured to record the EM variations and pass data concerning the variations to other such sensors. As a result, the variations in EM waves can be leveraged to configure sensors to pass data along to a controller, thereby reducing the need of a dedication communication network. As a result, the detection system and a corresponding method for detection may be established that is low energy, efficient, and cheap, while permitting a user to determine the presence of vehicles in parking spaces and vehicle traffic throughout the parking facility.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now in detail to the figures in which like numerals represent the same or similar elements and initially to FIG. 1, a high-level system/method for smart parking facility management by using wireless communication techniques to perform stationary and moving vehicle detection is illustratively depicted in accordance with one embodiment of the present principles.

In one embodiment, a parking facility management system 1 in contemplated. The parking management system 1 may include a plurality of sensors 10 distributed throughout a parking facility. The sensors 10 are configured to detect the presence of vehicles. Accordingly, the sensors 10 may be located in each parking space within a parking facility. Other arrangements are contemplated, however, such as a given sensor for sensing each of a plurality of parking spaces. The sensors 10 may be sensors for directly sensing an object, such as infrared or ultrasound sensors. However, according to aspects of the invention, the sensors 10 may be sensors capable of detecting the metal of a vehicle. For example, magnetometers may be employed to sense the iron of the vehicle structure, or RFID sensors may be used to detect and analyze the disruption of signals returned by RFID tags due to metal in the vehicle. Any sensor suitable for detecting the metal within a vehicle may be employed.

The sensors 10 may sense a vehicle's presence and communicate a signal across a communication network 11. The communication network 11 may be any wired or wireless backhaul network, such as a wired local area network (LAN), WiFi, ZigBee, Bluetooth, RFID, Ethernet, free-space optical, microwave radio relay, and any other suitable wired or wireless networking technology. According to aspects of the present invention, the communication network 11 may be based on RFID technologies.

The communication network 11 may return the signal from each of the sensors 10 to a central controller 12. The central controller 12 may include computer hardware for processing the signals and providing information to a user. Accordingly, the central controller 12 may include a computer processor, memory such as random access memory (RAM) or read only memory (ROM), storage such, e.g., a hard drive, a solid state drive (SSD) or other storage device, input devices such as a keyboard, mouse and/or touch screen, and a display device. Other components are also contemplated. Alternatively, the central controller 12 may be a cloud based processing system, such as, e.g., a virtual machine on a server.

The central controller 12 may analyze the signals from the sensors 10 to determine whether a vehicle occupies a particular parking space. For example, according to an aspect of the invention, an RFID sensor may detect communication with an RFID tag in a particular parking space, and the central controller 12 may then analyze aspects of the communication between the RFID sensor and RFID tag to determine if there is a vehicle in the parking space that is disrupting the RFID communication. Based on the disruption, the central controller 12 may monitor the RFID sensor in real-time to determine the presence of a vehicle, as well as the movement of a vehicle. Another possible example according to an aspect of the invention includes a magnetometer generating a signal based on the location and movement of detected metal in or near the parking space and communicating the signal to the central controller 12 to determine if the metal detected corresponds to a vehicle. The signal may also be monitored in real-time to determine if the detected metal is moving, and in what direction. Or a combination of RFID and a magnetometer may be used.

By determining the relative location of a vehicle with respect to a particular sensor, the central controller 12 may also determine the location of vehicles moving through paths within the parking facility. In order to increase accuracy, signals from various sensors may be aggregated to determine the location of a particular vehicle. As a result, the central controller 12 may also determine traffic patterns within the parking facility.

The central controller 12 may then use the signals provided by the various sensors 10 across the communication network 11 to match vehicle movement and location to the parking facility. For example, the central controller 12 may match a particular sensor to a particular parking space or location within the parking facility.

The central controller 12 may additionally send the status of each parking space, as well as traffic patterns, to a user terminal 14. The user terminal 14 may correspond to an interface for a manager or other employee of the parking facility, and may serve as a parking occupancy indicator device. The user terminal 14 may include a display screen, a touch screen, and input devices such as a keyboard and mouse such that the user may interact with the data from the central controller 12. The data may depict vehicle location within the parking facility. The vehicle location may be depicted, either in list form, or graphically, such as, e.g., on a map, or with any other suitable user interface for displaying vehicle location and movement within the parking facility. Other data may include a sum of all of the occupied parking spaces and/or a sum of all of the unoccupied parking spaces. Accordingly, a manager or employee may manage allocation of parking resources, such as directing vehicles to particular locations, tracking how long spaces have been continuously occupied, assigning tow trucks to vehicles in particular spaces, etc.

Similarly, the central controller 12 may display sensor data to a parking customer via a customer interface 13. The customer interface 13 may be, e.g., a fixed terminal within the parking facility that a customer may access, or the customer interface 13 may be a mobile or Internet application, and may serve as a parking occupancy indicator device. The customer interface 13 may include data such as real-time traffic patterns as determined from sensor data, occupied and unoccupied parking spaces as determined from sensor data, exit and entry locations and stairwells, and in some embodiments, the location of the customer's vehicle within the parking facility.

Figure 2:
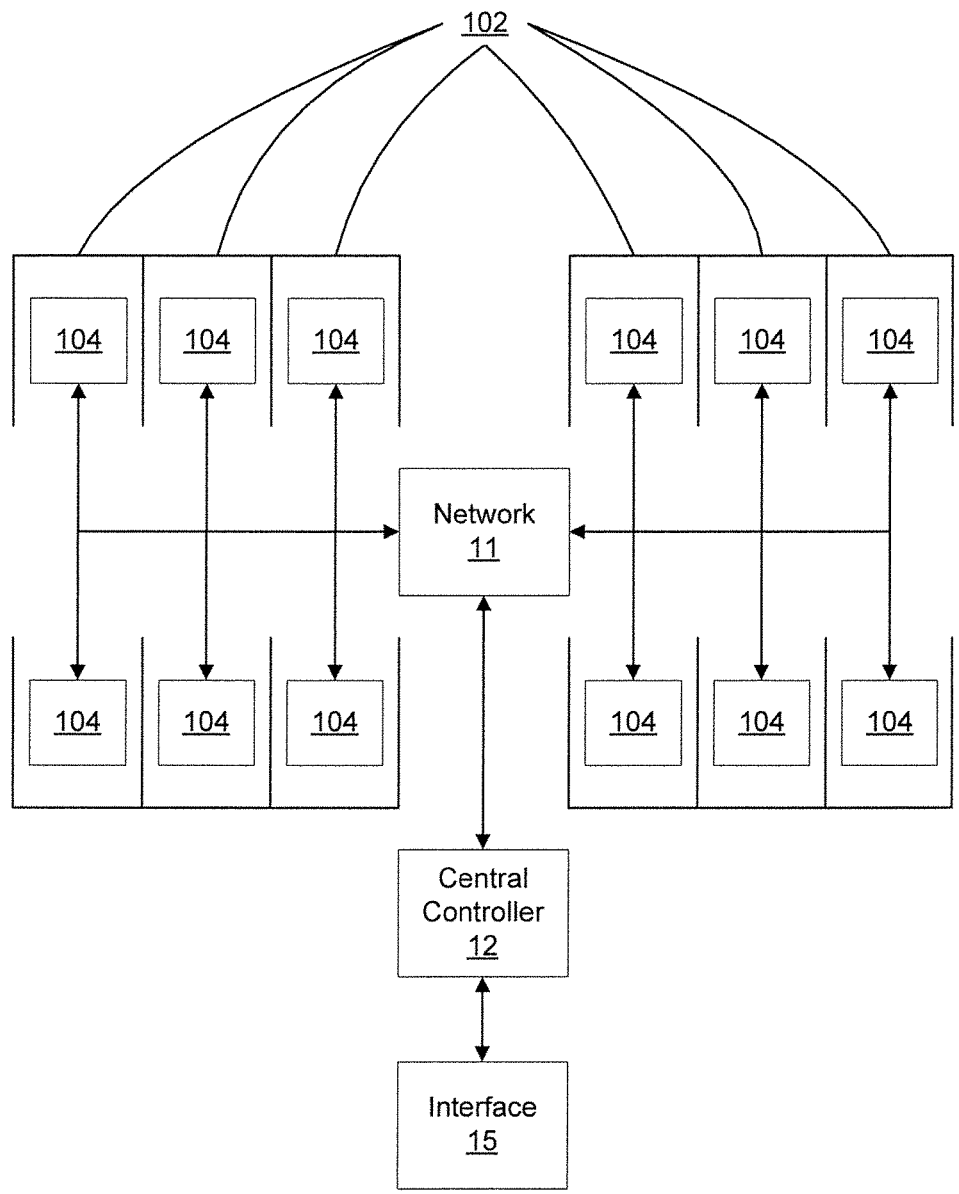
FIG. 2 is a block/flow diagram illustrating a system/method for smart parking facility management by performing stationary and moving vehicle detection using sensors, in accordance with the present principles.

Referring now to FIG. 2, a system/method for smart parking facility management by performing stationary and moving vehicle detection using sensors is illustratively depicted in accordance with an embodiment of the present principles.

According to aspects of the invention, a system for smart parking facility management is contemplated that includes a parking facility having multiple parking spaces 102. Each parking space 102 may include a sensor 104 located therein. Each of the sensors 104 may be uniquely identifiable as corresponding to a particular parking space 102. As a result, upon detection of a vehicle by a particular sensor 104, the corresponding parking space 102 may be determined as being occupied. The sensors 104 may include suitable sensors for detecting the location and/or movement of objects. For example, according to aspects of the invention, sensors 104 include three-axis magnetometers, however other sensors may be used, such as, e.g., ultrasound sensors, infrared sensors, stress/strain sensors, and other suitable sensors.

In the case of the sensors 104 including magnetometers, the sensors 104 may detect the iron in a vehicle. Because vehicles often include a large iron mass, sensors 104 may reliable detect the iron in the vehicles by taking magnetic field readings at regular intervals (or, alternatively, continuously). The presence and variation of magnetic fields around the sensors 104 may then be analyzed to determine if a vehicle is nearby. For example, the sensors 104 may detect a variation in the order of magnitude of a magnetic field. The order of magnitude variation may be logged as a data point and analyzed with other logged data points from a preceding time interval according to an algorithm, such as, e.g., a mean square error algorithm. Other functions may be used for the analysis, such as root-mean-square error, maximum-likelihood estimation, total least squares, generalized least squares, ridge regression, lasso regression, least absolute deviation, or other regression techniques.

By using a three-axis magnetometer, the sensors 104 may log the magnitude of each axis of the magnetometer. As a result, the magnitude of the magnetic fields around the sensors 104 are measured in 3-dimensional space, resulting in more information for each logged data point. Because the magnetic field magnitude in each of the 3-dimensions is logged for each data point, the algorithm can more accurately determine the presence of an iron mass, such as a vehicle. Additionally, the variation of the magnetic field on each axis of the sensors 104 can be used to determine the movement of the iron mass in each direction, and thus determine both the location and movement of the iron mass and the corresponding vehicle.

The algorithm may be performed by a processor included with each sensor 104. Thus, the processing is performed locally, permitting the sensors 104 to communicate vehicle location and/or movement across the communication network 11 to the central controller 12. However, alternatively, the sensors 104 may be configured to communicate the logged data points across the communication network 11 to the central controller 12. The central controller 12 may then process the logged data points with the algorithm. Accordingly, the sensors 104 may be made cheaper, allowing for easier replacement in the case of damage. Although, if the sensors 104 perform the processing locally, communication burden is reduced, thus improving the performance of the communication network 11 by reducing bandwidth requirements.

The central controller 12 may use the results of the algorithm to determine if a car is present at a particular location, such as within a particular parking space 102. As discussed above, each of the sensors 104 is uniquely identifiable as corresponding to a particular parking space 102. As a result, the results of the algorithm determine when a vehicle is present at a particular sensor 104, and thus at a particular parking space 102. The central controller 12 may then present to a user or customer at an interface 15 which of the parking spaces 102 have a vehicle detected therein. The interface 15 may be a user terminal 14, or it may be the customer interface 13, or both. As a result, the user or the customer may be able to determine from the interface 15 which parking spaces 102 are unoccupied. For example, the central controller 12 may present, through the interface 15 a graphical map of the parking facility with a depiction of a vehicle located in each occupied parking space 102 depicted on the map. The map may show other features, such as the location of entries, exits, stairwells, etc.

Because the sensors 104 detect variation in the magnitudes of each dimension of magnetic fields, the movement of nearby iron masses may also be detected and processed by the central controller 12. The interface 15 may therefore depict to the user or customer, on the map, the movement of corresponding vehicles. Thus, the user or customer may view traffic patterns within the parking facility by, e.g., a depiction such as color coding the pathways of the parking facility corresponding to the traffic load in various areas of the parking facility (for example, a particular stretch of a pathway may be depicted as red, corresponding to heavy traffic).

Figure 3:
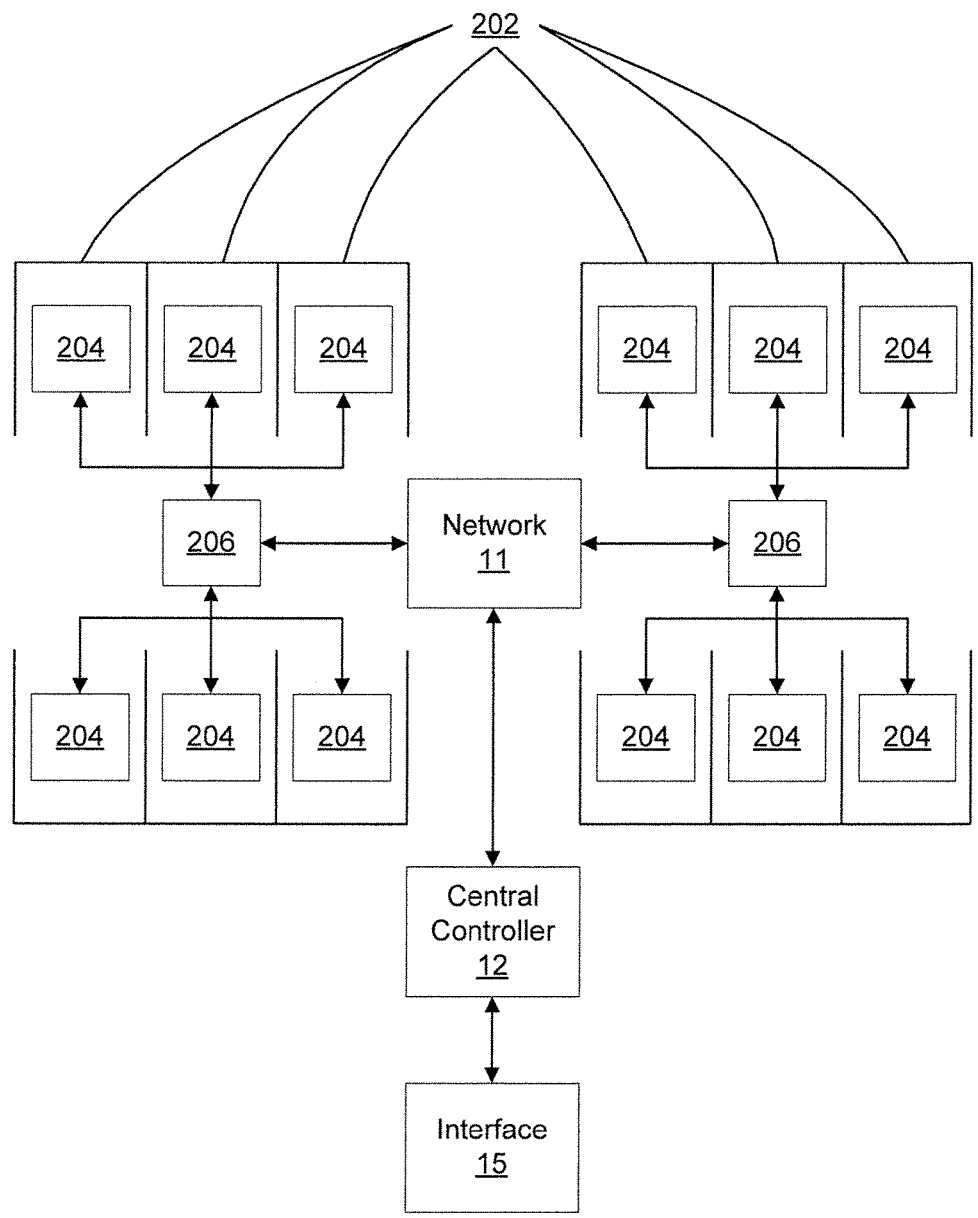
FIG. 3 is a block/flow diagram illustrating a system/method for smart parking facility management by performing stationary and moving vehicle detection using sensors such as radio frequency identification (RFID) sensors, in accordance with the present principles.

Referring now to FIG. 3, a system/method for smart parking facility management by performing stationary and moving vehicle detection using sensors such as radio frequency identification (RFID) sensors is illustratively depicted in accordance with an embodiment of the present principles.

According to aspects of the invention, a parking facility may include a plurality of parking spaces 202, each with a sensor 204 located therein. According to aspects of the invention, the sensors 204 may include RFID tags. The RFID tags 204 may be passive or active tags. The RFID tags 204 may communicate with an RFID interrogator 206 such that the RFID interrogators 206 send a request to each RFID tag 204, and then receive a reply from each RFID tag 204 in the form of a backscattered signal. The backscattered signal from the RFID tags 204 includes signal characteristics such as power and power distribution, differential signal phase, the read rate of the RFID tag 204, and other characteristics. If a vehicle is near to an RFID tag 204, the signal characteristics of the corresponding RFID tag 204 may change in a detectable manner.

Accordingly, the RFID interrogators 206 may receive the backscattered signals from the RFID tags 204 and communicate across the communication network 11 with the central controller 12. Each RFID interrogator 206 may then locally determine, using a processor, whether a vehicle is present at a particular location. By determining the location of a vehicle using a local processor on the RFID interrogator 206, communication demands are reduced, thus reducing bandwidth requirements for the communication network 11. However, alternatively, data from the backscattered signals may be sent across the communication network 11 to the central controller 12. The central controller 12 may then determine, using a processor, the location of vehicles with respect to RFID tags 204. By determining the location of vehicles with the central controller 12, RFID interrogators 206 may be made cheaper, permitting easier replacement in the case of damage.

Because a vehicle will often contain a relatively large amount of metal, or other radio frequency blocking materials, the presence of a vehicle will force the backscattered signal from the RFID tag 204 to go around the vehicle, effectively increasing the signal path length. By determining the length of the signal path, the presence, and even the location of a vehicle may be determined. And by determining the signal path length over multiple sample periods in time, the movement of a vehicle may be determined. As a result, according to aspects of the invention, the presence of a nearby vehicle is determined according to an analysis of the power, or received signal strength indication (RSSI), distribution of the backscattered signal of RFID tags 204, and the differential signal phase between the request signal and the backscattered signal. The RFID interrogators 206 may collect and log samples including the RSSI distribution and different signal phase for each RFID tag 204 periodically (or, alternatively, continuously). The samples will only be logged if they meet a criteria for sample frequency (time lag between each sample).

After samples have been logged, data is cleansed by reducing ambiguity in differential phase shift of the samples for each sample period. Differential phase shift can have ambiguity up to $2\pi$, although in some hardware, the differential phase shift will be $\pi$. One way of reducing the ambiguity is by intra-frequency differential phase ambiguity resolution.

The RFID interrogators may operate in a given frequency range such as, e.g., 902 to 928 megahertz (MHz), that will be hopped along equally spaced bands within the frequency range, such as, e.g., 50 equally spaced bands. However, other frequency ranges and band quantities are contemplated. Within each frequency band, the logged differential phase shifts for a current sample period are grouped according to a desired classification within the frequency band, such as, e.g., a particular signal path length correlated with a particular differential phase shift. A representative value is then determined for each group of differential phase shifts for each frequency band of the current sample period. The representative value may be an arithmetic mean, a weighted mean, a median, or other suitable representation of the statistical representation for each group, and stored in a buffer or computer storage. As a result, a represented value for each group in each frequency band is calculated. Thus, the differential phase shift in each of the frequency bands for the current sample period may be more accurately represented.

The representative values may then undergo inter-frequency phase ambiguity resolution, by fitting an appropriate curve across the frequency bands. A differential phase shift curve across frequency bands will approximate a straight line for bandwidths that are small relative to a center frequency. However, for larger bandwidths relative the center frequency, the differential phase shift curve will be a hyperbola. As a result, the shape of the curve may vary depending on the frequencies and frequency bands used. A curve may be fit to the samples by performing a regression across all possible different phase offsets over time for each frequency band.

However, this method may take a long time and be very resource intensive for a processor to perform. Accordingly, a greedy algorithm may be employed to fit the appropriate curve to a representative value for a given frequency band along with the representative values in adjacent frequency bands. This process may be repeated for each frequency band to form a continuous curve across all frequency bands. For sufficiently small frequency bands, the fitted curve for each point may be approximated as linear, as described above. As a result, a curve may be fitted to the differential phase offset representative values for the current sample period in a fast and efficient manner.

The curve of representative values across frequency for the current sample period may be indicative of a particular signal path length from a given RFID tag 204 to a given RFID interrogator 206. The particular signal path length, and a corresponding distance, may be determined based on the curve through, for example, a look-up table that has been previously calculated with calibration RFID tags, or by calibration with the RFID tags 204 when the parking facility is closed or empty. By matching a distance with the curve, the location of a vehicle may be determined. For example, a vehicle passing by a particular parking space 202 may affect the signal of the RFID tag 204 in both that parking space 202 as well as nearby spaces 202. The different differential phase offsets for each affected RFID tag 204 may be processed as described above, and compared to triangulate the exact location of a vehicle, including the location of a vehicle in a particular parking space 202. And by comparing the differential phase offsets for each affected RFID tag 204 across multiple sample periods, the variation may be used to determine a variation in distance, and thus movement of a vehicle.

Figure 4:
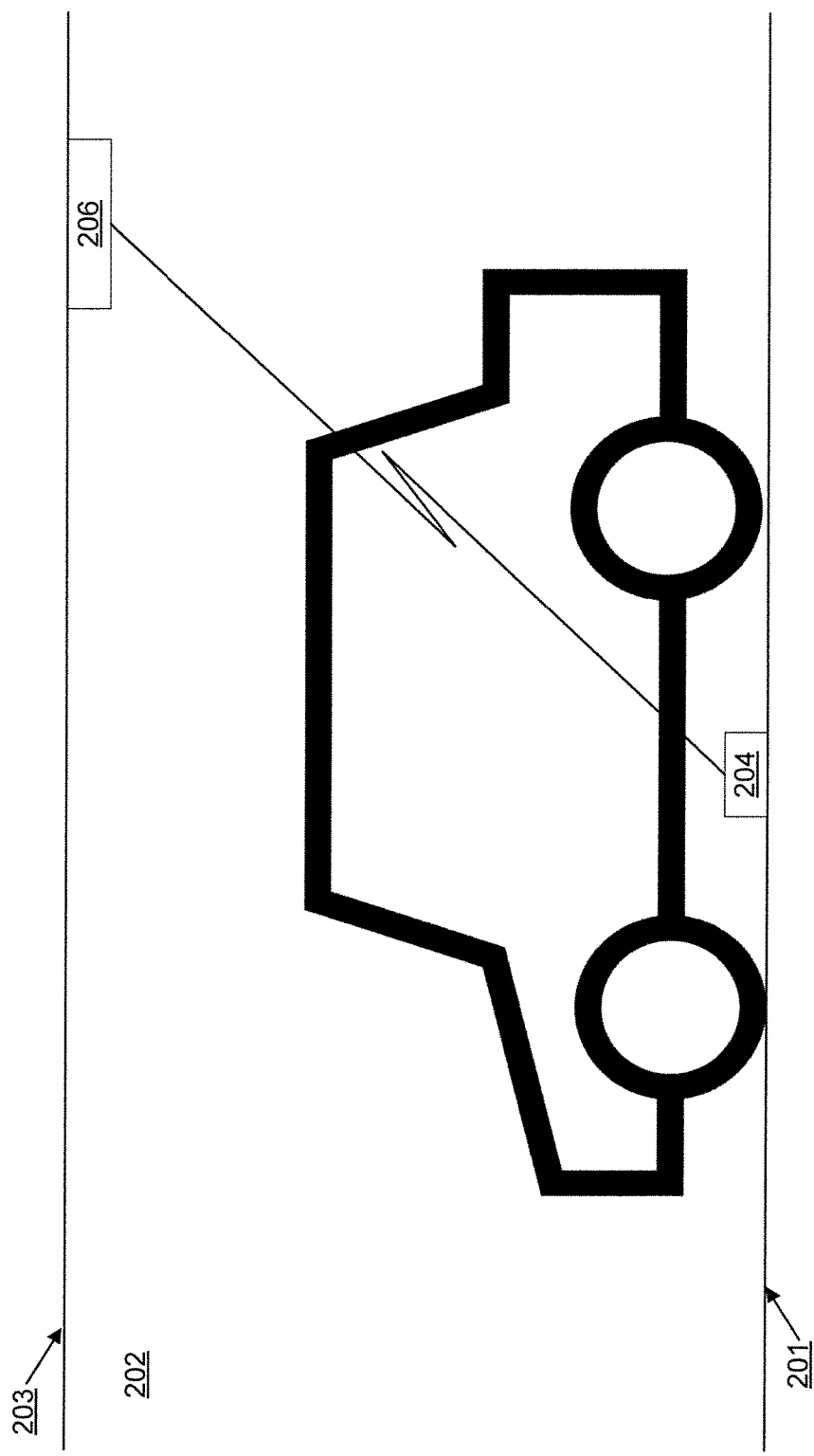
FIG. 4 is diagram illustrating a system/method for smart parking facility management by performing stationary and moving vehicle detection with wireless communication between RFID sensors, in accordance with the present principles.

Additionally, in order to improve the accuracy of determining if a vehicle occupies a particular parking space 202, the RSSI of the backscattered signals may be analyzed. If a vehicle is located in between the direct line of sight between a given RFID tag 204 and an RFID interrogator 206, then the gain of the RSSI will be insignificant such that the backscattered signal is effectively blocked. As a result, if the given RFID tag 204 fails to reply to a request from an RFID interrogator 206, thus indicating a blocked backscattered signal, a vehicle may be occupying the parking space 202 corresponding to that RFID tag 204. Accordingly, in order to improve the accuracy of blocking backscattered signals, an RFID tag 204 may be fixed to a floor 201 of each parking space 202. An RFID interrogator 206 may then be attached to a ceiling 203 (or alternatively, a post or pillar). As a result, a signal from the RFID tag 204 to the RFID interrogator 206 is blocked by a vehicle 210, as depicted in FIG. 4.

Accordingly, the differential phase offsets from the backscattered signals of the RFID tags 204 in addition to the RSSI of the backscattered signals may be used to track vehicle movement and location within the parking facility, including whether a vehicle occupies a particular parking space 202.

The signal analysis described above may be performed by a processor included with each RFID interrogator 206. Thus, the processing is performed locally, permitting the RFID interrogator 206 to communicate vehicle location and/or movement across the communication network 11 to the central controller 12. However, alternatively, the RFID interrogator 206 may be configured to communication the logged data points across the communication network 11 to the central controller 12. The central controller 12 may then process the logged data points with the algorithm. Accordingly, the sensors 104 may be made cheaper, allowing for easier replacement in the case of damage. Although, if the RFID interrogator 206 perform the processing locally, communication burden is reduced, thus improving the performance of the communication network 11 by reducing bandwidth requirements.

The central controller 12 may use the results of the algorithm to determine if a car is present at a particular location, such as within a particular parking space 202. As discussed above, each of the RFID tags 204 is uniquely identifiable as corresponding to a particular parking space 202. As a result, the results of the algorithm determine when a vehicle is present at a particular RFID tag 204, and thus at a particular parking space 202. The central controller 12 may then present to a user or customer at one of the interface 15 which of the parking spaces 202 have a vehicle detected therein. As a result, the user or the customer may be able to determine from the interface 15 which parking spaces 202 are unoccupied. For example, the central controller 12 may present, through the interface 15, a graphical map of the parking facility with a depiction of a vehicle located in each occupied parking space 202 depicted on the map. The map may show other features, such as the location of entries, exits, stairwells, etc.

Because both location and movement of vehicles may be determined from the RFID tag 204 signals, the interface 15 may therefore depict to the user or customer, on the map, the movement of the vehicles. Thus, the user or customer may view traffic patterns within the parking facility by, e.g., a depiction such as color coding the pathways of the parking facility corresponding to the traffic load in various areas of the parking facility (for example, a particular stretch of a pathway may be depicted as red, corresponding to heavy traffic).

This process may be combined with an additional RFID tag held by a customer driving the vehicle. The RFID interrogator 206 may additionally receive a backscattered signal from the customer's RFID tag having identifying information to associate a specific customer with a specific vehicle occupying the parking space 202. The customer's additional RFID tag may be associated with a specific vehicle occupying the parking space 202 because the time at which the additional RFID tag is sensed will be contemporaneous with the time at which the RFID interrogator 206 detects that the parking space 202 has been occupied based on the backscattered signal of the RFID tag 204. As a result, this customer and the user may also view the location of identifiable vehicles, as reproduced on the depiction on the interface 15.

Figure 5:
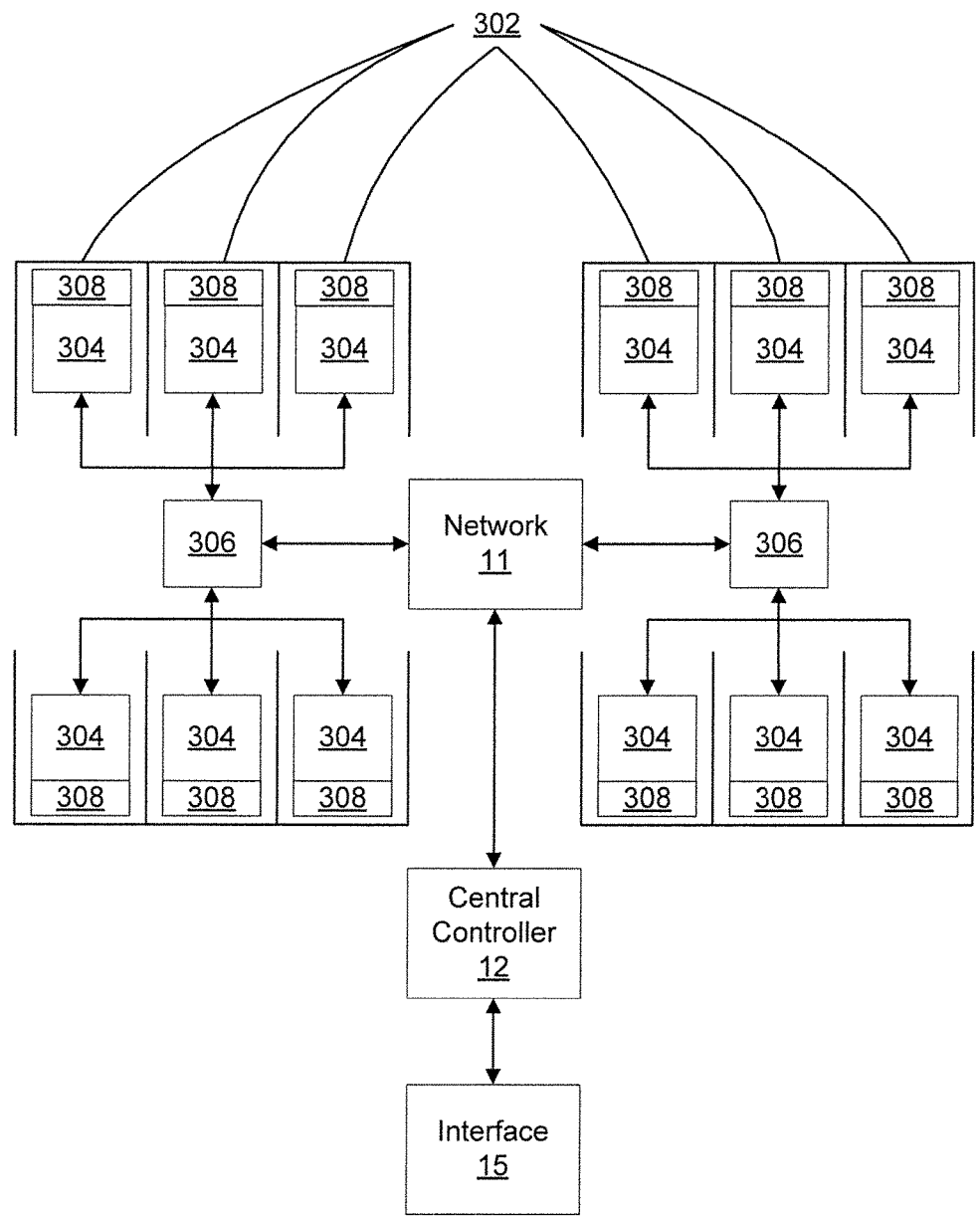
FIG. 5 is a block/flow diagram illustrating a system/method for smart parking facility management by performing stationary and moving vehicle detection with wireless communication between RFID sensors, in accordance with the present principles.

Referring now to FIG. 5, a system/method for smart parking facility management by performing stationary and moving vehicle detection with wireless communication between RFID sensors is illustratively depicted in accordance with an embodiment of the present principles.

According to aspects of the invention, a system for smart parking facility management may include RFID tags 304 positioned within each parking space 302, the RFID tags 304 being operatively connected to an additional sensor 308, such as a magnetometer as described above. Other additional sensors 308 may be used, such as infrared sensors, ultrasound sensors, photodetectors, weight sensors, stress/strain sensors, or other suitable sensing devices.

The additional sensors 308 may communicate with the RFID tags 304 such that the accuracy of detecting a vehicle occupying a parking space 302 is improved. According to aspects of the invention, the accuracy may be improved by employing the additional sensors 308 as described in embodiments above while concurrently employing the RFID tags 304 as described in embodiments above. A processor included with the RFID tags 304 and/or the additional sensors 308 may process the signals (such as by methods described above) to combine the results from each of the RFID tags 304 and the additional sensors 308. By combining the results, more data is included in the analysis, thus reducing noise and reducing error and improving the accuracy of determining vehicle location and movement.

Alternatively or additionally, the additional sensors 308 may be used for disabling the RFID tags 304 in the event that a vehicle occupies a space. The additional sensors 308 may determine that a vehicle is occupying a parking space 302 by, for example, the variation in magnetic field around the parking space 302 due to an iron mass of a vehicle. Upon determining the presence of a vehicle, the additional sensors 308, via a processor, may instruct the RFID tags 304 to shut off or otherwise be disabled. As a result, the RFID tags 304 will not return a signal to the RFID interrogators 306. The absence of a signal may be used to infer that a vehicle is present in a particular parking space 302 based on which RFID tag 304 is failing to return the signal. By using the additional sensors 308 to disable RFID tags 304 in occupied parking spaces 302, calculations are reduced and communication bandwidth is preserved, thus increasing the speed and efficiency of processing, while also improving the reliability and integrity of the communication network 11.

The signals from the RFID tags 304 and the additional sensors 308 may then be used to display to a user or customer via interface 15 the number and location of occupied and/or unoccupied parking spaces 302, as well as traffic patterns within the parking facility, as described in relation to embodiments above.

Additionally, according to aspects of the invention, the additional sensors 308 may be low powered sensors. By requiring low power, the additional sensors 308 may be powered only by power harvesting. As a result, the additional sensors 308 may draw power from the RFID tags 304, which in turn are powered solely by the signal sent by interrogators 306. Because the interrogators 306 communicate with the RFID tags 304 via RF radiation, the radiation carries energy. This energy sufficient to provide enough power to an RFID tag 304 to received and respond to the communication. Moreover, the energy may be used by the additional sensor 308 attached to the RFID tag 304 to communicate measurements taken by the additional sensors 308.

Figure 6:
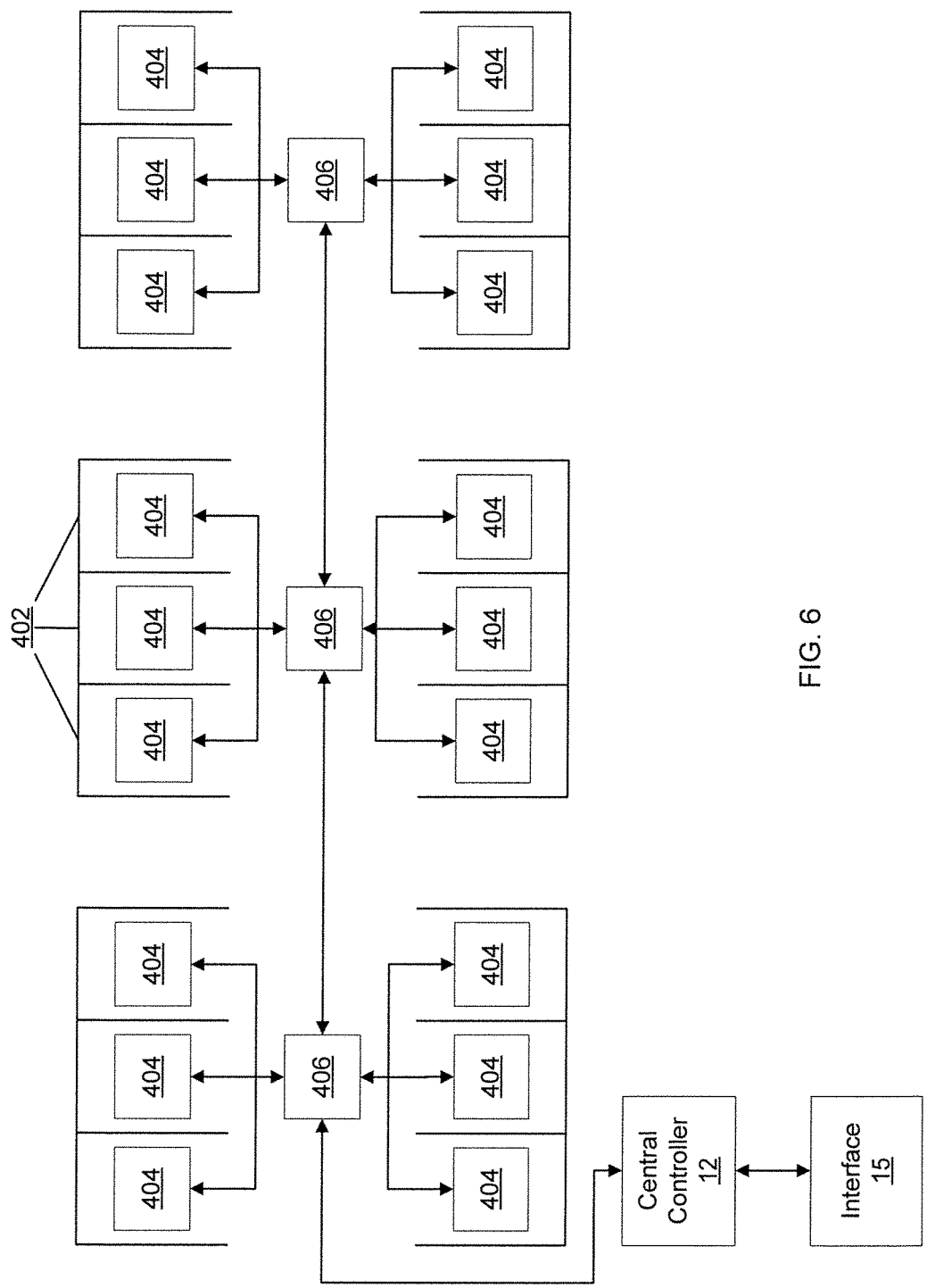
FIG. 6 is a block/flow diagram illustrating a system/method for smart parking facility management by performing stationary and moving vehicle detection with wireless communication between RFID readers, in accordance with the present principles.

Referring now to FIG. 6, a system/method for smart parking facility management by performing stationary and moving vehicle detection with wireless communication between RFID sensors is illustratively depicted in accordance with an embodiment of the present principles.

According to aspects of the invention, a communication network may be replaced with a system of RFID interrogators 406. As described in relation to embodiments above, RFID interrogators 406 may distributed throughout a parking facility to read backscattered signals from sensors 404 including RFID tags corresponding to each parking space 402. The RFID interrogators 406 may intercommunicate and aggregate the backscattered signal data, and communicate it to the central controller 12 for analysis and/or presentation to a user and/or customer via interface 15.

According to aspects of the invention, the RFID interrogators 406 may pass information between each other by being configured to operate as both a reader and an active tag. For example, because RFID interrogators 406 will not generate a backscattered signal in the way that an RFID tag will, each RFID interrogator 406 may be programmed to include a unique electronic product code (EPC) as well as the knowledge of the EPC for each other RFID interrogator 406. A first RFID interrogator 406 may then send a request to a second RFID interrogator 406 using the EPC of the second RFID interrogator 406. The second RFID interrogator 406 may then reply to the first RFID interrogator 406 using the EPC of first RFID interrogator 406. This exchange negates the need for a backscattered signal, as would be used in communication with an RFID tag.

By using this exchange process, the RFID interrogators 406 may pass data from one to the next. For example, a first RFID interrogator 406 may send the data in a request to a second RFID interrogator 406, which may store the data, send a reply, and send a request including the stored data as well as additional data to a third RFID interrogator 406. This process may be repeated until all data from all of the sensors 404 is aggregated by the RFID interrogators 406 and delivered in a request to the central controller 12. Alternatively, the process may happen in reverse, whereby the data is included in the reply rather than the request, and is passed along and aggregated via replies until it is delivered in a reply to a request from the central controller 12.

Figure 7:
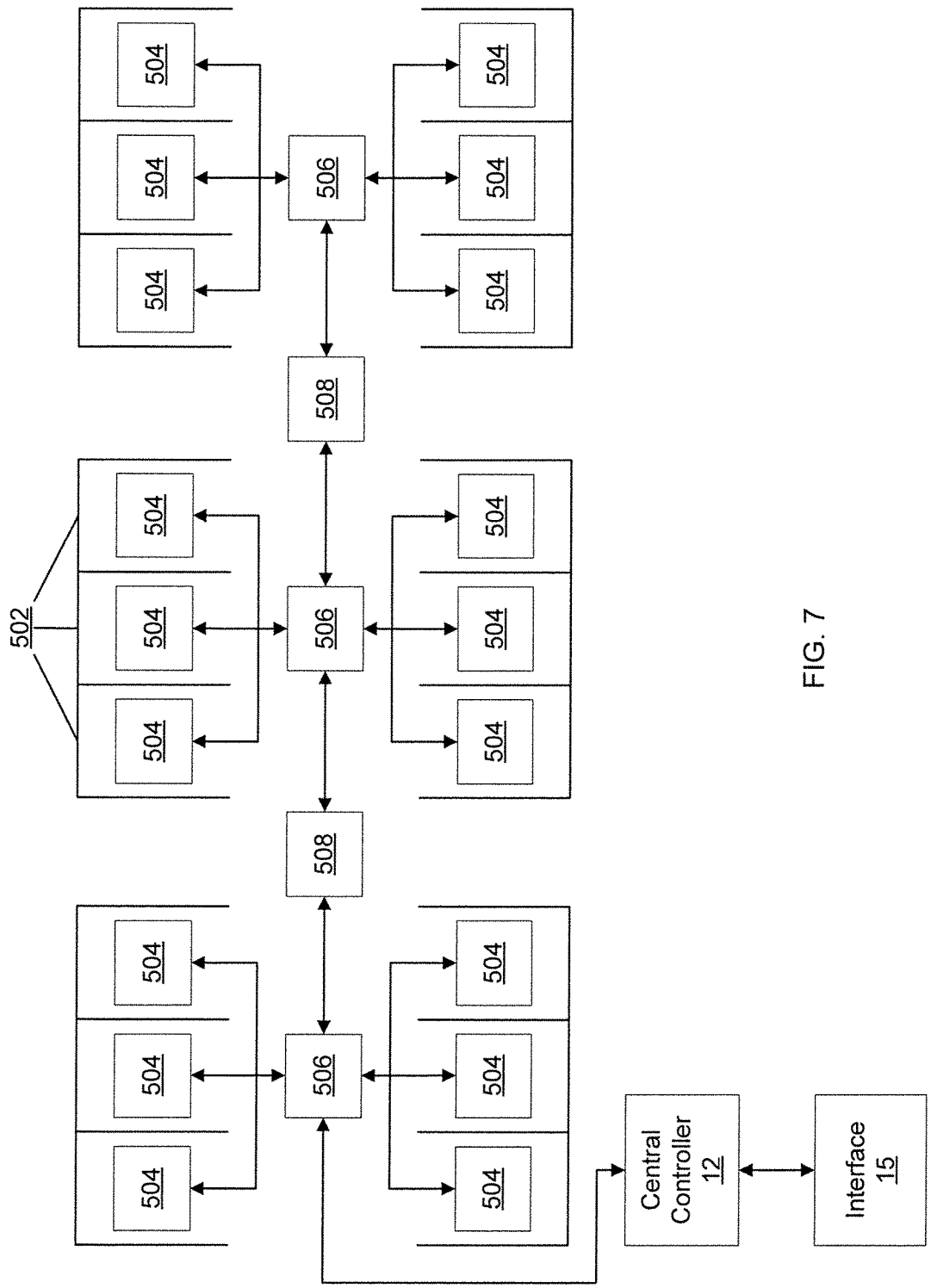
FIG. 7 is a block/flow diagram illustrating a system/method for smart parking facility management by performing stationary and moving vehicle detection with wireless communication between RFID readers and intermediary RFID tags, in accordance with the present principles.

Referring now to FIG. 7, a system/method for smart parking facility management by performing stationary and moving vehicle detection with wireless communication between RFID sensors and intermediary RFID tags is illustratively depicted in accordance with an embodiment of the present principles.

According to aspects of the invention, a communication network may be replaced with a system of RFID interrogators 506. As described in relation to embodiments above, RFID interrogators 506 may distributed throughout a parking facility to read backscattered signals from sensors 504 including RFID tags corresponding to each parking space 502. The RFID interrogators 506 may intercommunicate and aggregate the backscattered signal data, and communicate it to the central controller 12 for analysis and/or presentation to a user and/or customer via interface 15.

According to aspects of the invention, the distributed RFID interrogators 406 may intercommunicate via intermediary RFID tags 508. The intermediary RFID tags 408 may be writable. As a result, a first RFID interrogator 506 may collect data concerning backscattered signals from the sensors 504 nearest to it. The first RFID interrogator 506 may then write the data onto a first intermediary RFID tag 508 via a request to the first intermediary RFID tag 508. A second RFID interrogator 506 may then send a request to the first intermediary RFID tag 508, which may respond with a backscattered signal that include the previously written data from the first RFID interrogator 506. Upon receiving the backscattered signal from the first intermediary RFID tag 508, the second RFID interrogator 506 may store the data and aggregate it with data from the sensors 504 nearest to it. The second RFID interrogator 506 may then communicate the aggregated data to a third RFID interrogator 506 using a similar process as described above with a second intermediary RFID tag 508. The process may be repeated until either an RFID interrogator 506 or an intermediary RFID tag 508 sends the aggregated data to the central controller 12.

Figure 8:
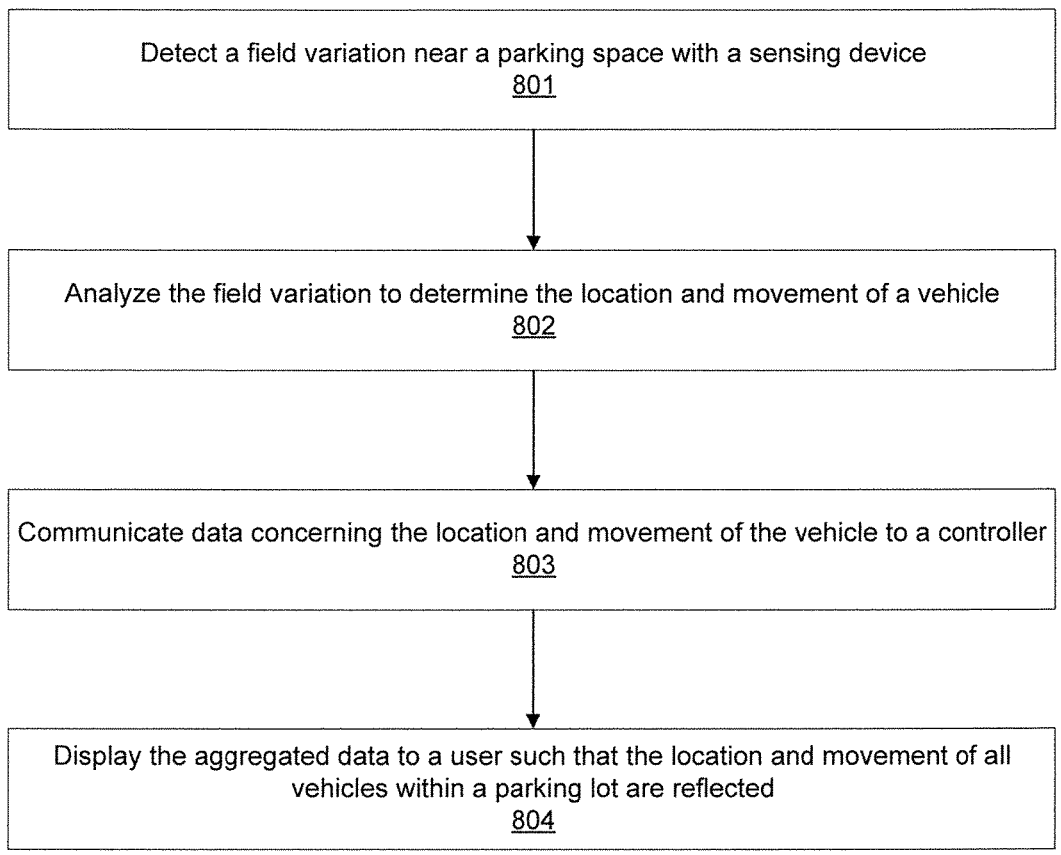
FIG. 8 is a flow diagram illustrating a system/method for smart parking facility management by using wireless communication techniques to perform stationary and moving vehicle detection, in accordance with the present principles.

Referring now to FIG. 8, a system/method for smart parking facility management by using wireless communication techniques to perform stationary and moving vehicle detection is illustratively depicted in accordance with an embodiment of the present principles.

According to aspects of the invention, a method for smart parking facility management may include, at block 801, detecting an electromagnetic variation near a parking space with a sensing device. The sensing device may include a standalone sensor, such as a three-axis magnetometer, as described above, an infrared sensor, an ultrasound sensor, a photodetector, or a weight detector such as a stress or a strain gauge. The standalone sensor may therefore detect field variations such as magnetic field variations, infrared variations, acoustic variations, visible light variations or weight variations, respectively. Alternatively, or in combination with the standalone sensor, according to aspects of the present invention, the sensing device include a reader component and an identification tag, such as an RFID reader and RFID tag, or an NFC reader and NFC tag. Accordingly, the reader component may send a request to the tag component and detect variations in the reply, such as variations in the RSSI and differential phase change of a backscattered reply signal, as described above.

At block 802, the system may then analyze the field variations to determine the location and movement of a vehicle. For example, as described above, a three-axis magnetometer may include a processor to analyze magnetic field magnitude variations along each axis to determine location and movement of an iron mass, such as the iron of a vehicle. Alternatively or in combination, as described above, the reader component may include a processor to analyze the RSSI and differential phase change of the backscattered signal to determine the location and movement of an RF blocking mass, such as the metal of a vehicle.

At block 803, the system may communicate data concerning the location and movement of the vehicle to a controller. The communication of data may be performed by a backhaul network, such as a wired local area network (LAN), WiFi, ZigBee, Bluetooth, RFID, Ethernet, free-space optical, microwave radio relay, and any other suitable wired or wireless networking technology. Alternatively, the communication may be performed by the reader components, which may be configured to aggregate and pass information to subsequent readers, until it reads the controller.

According to aspects of the invention, block 802 and 803 may be switched, whereby field variation data is communicated to a controller prior to being analyzed.

At block 804, the system may display the data to a user in a suitable format such that the location and movement of all vehicles within the parking lot are reflected to the user, as described in embodiments above. Accordingly, the user may view occupied and unoccupied parking spaces and their locations relative to landmarks such as stairwells, entries and exits. The user may also view traffic patterns and thus find less crowded portions of a parking facility.

Figure 9:
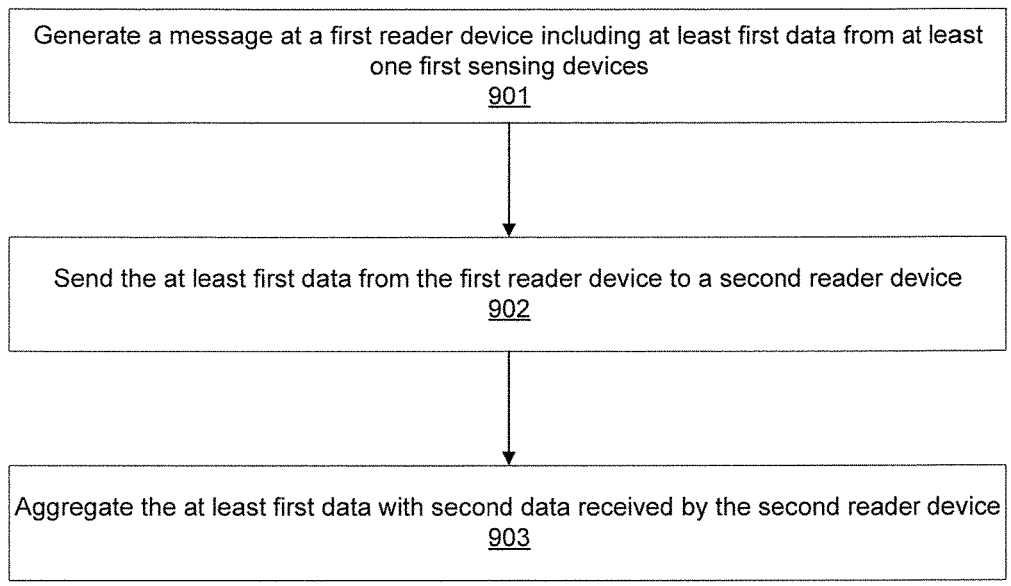
FIG. 9 is a flow diagram illustrating a system/method for communication for smart parking facility management by using wireless communication techniques to perform stationary and moving vehicle detection, in accordance with the present principles.

Referring now to FIG. 9, a system/method for communication for smart parking facility management by using wireless communication techniques to perform stationary and moving vehicle detection is illustratively depicted in accordance with an embodiment of the present principles.

As described above, data may be communicated to a controller via relaying the information across a series of reader components. According to aspects of an embodiment of the present invention, at block 901, the system may generate a message at a first reader device, the message including at least first data from at least one first sensing device. According to embodiments, such as those described above, the reader device may be a RFID reader or an NFC reader, and the sensing device may be a RFID tag or NFC tag, respectively.

At block 902, the system may send the at least first data from the first reader device to a second reader device. The first data may be sent directly from the first reader to the second reader by sending the data with an EPC of the second reader device, as described in embodiments above. Alternatively, the first reader device may send the data in a request to a first intermediary tag, such that the first data is written to the first intermediary tag. In a subsequent request by the second reader device, the first intermediary tag may reply to the second reader device, including the written data in the backscattered signal reply.

At block 903, the system may then aggregate the at least first data with second data received by the second reader device. The aggregation may occur at the second reader device when the second reader device receives a signal from either the first reader device, or the first intermediary tag. The at least first data may be stored at the second reader device along with any other data that the second reader device has separately received or collected from other reader devices and sensing device.

Blocks 901 through 903 may be repeated with subsequent reader devices where the communicated data includes all collected data. The process is repeated until the data reaches a central controller.

Accordingly, the characteristics of a system employing sensors including readers and sensor devices may be leveraged to permit communication across the readers such that a separate, standalone communication network is not necessary. Such standalone networks can be expensive and inefficient. Thus, the system and method according to aspects of the present invention results in effective communication at low cost and high efficiency.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A system for detecting parking space occupancy by a vehicle comprising:
    a tag device fixed to each of at least one parking space;
    a first reader device configured to interrogate the at least one tag device and detect a reply signal from the at least one tag device;
    a processor configured to analyze characteristics of the reply signal from the tag device to determine a signal path length of the reply signal to identify the presence of a vehicle in the parking space due to an interaction of the received signal with a signal blocking body; and
    a communication device configured to communicate the presence of the vehicle to a parking occupancy indicator device.

2. The system as recited in claim 1, wherein the tag device is a radio frequency identification (RFID) tag, and the reader device is a RFID reader.

3. The system as recited in claim 1, wherein at least one of the tag device includes a sensing device configured to:
    sense a magnetic field variation caused by the presence of metal corresponding to the vehicle; and
    provide a measurement of the magnetic field variation to the first reader device by communicating the measurement to the tag device.

4. The system as recited in claim 3, wherein measurements from the sensing device enables and disables the tag device to signal the interrogator according to the measurement of the magnetic field variation.

5. The system as recited in claim 3, wherein the sensing device is powered through power harvesting.

6. The system as recited in claim 1, wherein the processor is configured to analyze the reply signal by:
    measuring a received signal strength indication (RSSI) of the received signal; and
    determining a presence of the vehicle according to the RSSI.

7. The system as recited in claim 1, wherein the processor is configured to analyze the reply signal by:

measuring the differential phase change between the interrogation and the received signal; and determining the signal path length according to the differential phase change.

8. The system as recited in claim 1, wherein the reply signal includes an identification corresponding to the vehicle.

9. The system as recited in claim 8, wherein the first reader device detects a second reply signal including the identification information from a second tag device associated with a vehicle.

10. The system as recited in claim 9, wherein the processor identifies a parking spot as corresponding to the second tag device based on a presence of the second tag device near the parking space concurrently with detecting the first reply signal.

11. A method for detecting parking space occupancy by a vehicle comprising:

interrogating at least one tag device by a first reader device, each of the at least one tag device being fixed to a respective one of the at least one parking space;

detecting, with the first reader device, a first reply signal from the at least one tag device;

analyzing characteristics of the reply signal from the tag device to determine a signal path length of the reply signal to identify the presence of a vehicle in the parking space due to an interaction of the received signal with a signal blocking body; and communicating the presence of the vehicle to a parking occupancy indicator device.

12. The method as recited in claim 11, wherein the at least one tag device is a radio frequency identification (RFID) tag, and the first reader device is a RFID reader.

13. The method as recited in claim 11, wherein at least one of the at least one tag device includes a sensing device configured to:

sense a magnetic field variation caused by the presence of metal corresponding to the vehicle; and provide a measurement of the magnetic field variation to the first reader device by communicating the measurement to the tag device.

14. The method as recited in claim 13, enabling and disabling the at least one tag device based on measurements from the sensing device to signal the interrogator according to the measurement of the magnetic field variation.

15. The method as recited in claim 13, wherein the tag device is powered through power harvesting.

16. The method as recited in claim 11, wherein the processing includes:

measuring a received signal strength indication (RSSI) of the first reply signal; and determining a presence of the vehicle according to the RSSI.

17. The method as recited in claim 11, wherein the processing includes;

measuring the differential phase change between the interrogation and the first reply signal; and determining the signal path length according to the differential phase change.

18. The method as recited in claim 11, wherein the first reply signal includes an identification corresponding to the vehicle.

19. The method as recited in claim 18, wherein the first reader device detects a second reply signal including the identification information from a second tag device associated with a vehicle.

20. The method as recited in claim 19, wherein the processor identifies a parking spot as corresponding to the second tag device based on a presence of the second tag device near the parking space concurrently with detecting the first reply signal.

* * * * *